United States Patent
Ohishi et al.

(10) Patent No.: US 6,938,745 B2
(45) Date of Patent: Sep. 6, 2005

(54) ONEWAY CLUTCH APPARATUS

(75) Inventors: Hiroyuki Ohishi, Hamamatsu (JP); Norihiro Yamamoto, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 37 days.

(21) Appl. No.: 10/761,249

(22) Filed: Jan. 22, 2004

(65) Prior Publication Data
US 2004/0245061 A1 Dec. 9, 2004

(30) Foreign Application Priority Data
Jan. 22, 2003 (JP) ........................................ 2003-013680

(51) Int. Cl.$^7$ ............................................. F16D 41/06
(52) U.S. Cl. ..................................... 192/45; 192/110 B
(58) Field of Search ................................ 192/41 R, 45, 192/53.1, 110 B

(56) References Cited

U.S. PATENT DOCUMENTS 5,135,085 A * 8/1992 Kinoshita et al. ......... 192/41 R
5,186,296 A * 2/1993 Kinoshita et al. ......... 192/41 R
5,372,227 A * 12/1994 Kinoshita et al. ............. 192/45
5,722,521 A * 3/1998 Awaji et al. ................. 192/45
6,044,945 A * 4/2000 Muramatsu ................... 192/45

* cited by examiner

Primary Examiner—Saul Rodriguez
(74) Attorney, Agent, or Firm—Miles & Stockbridge PC

(57) ABSTRACT

In a oneway clutch apparatus, block bearings for maintaining a space between an inner race and an outer race, each is formed in a tapered-shape with the circumferential width expanding toward a cylindrical surface side. A retainer comprises, in a retaining portion of the block bearing, bearing retaining pieces respectively enlarged from the cam surfaces along the both end surfaces in the circumferential direction of the block bearings. A bearing retaining piece has a latching portion for latching and retaining the block bearing at the tip end thereof.

12 Claims, 5 Drawing Sheets

ONEWAY CLUTCH APPARATUS

This application claims the benefit of Japanese Patent application No. 2003-013680 which is hereby incorporated by reference.

BACKGROUND OF THE INVENTION

1. Field of the Invention

The present invention relates to a oneway clutch-apparatus which is assembled into an automatic transmission, or the like, of a car and relates to the technology for facilitating attachment, or the like, of a block bearing to a retainer.

2. Related Background Art

Generally, an automatic transmission of a car is provided with a planetary gear speed changing mechanism capable of three to five speeds, in addition to a torque converter serving as a fluid coupling, and performs speed change by properly fixing or releasing a constituent element (such as a sun gear or a planetary gear) of the planetary gear speed changing mechanism by the use of a frictional engagement means such as a clutch or a brake. As the frictional engagement means to be incorporated in the automatic transmission, a multiple disc wet type in which friction plates and separator plates are alternately provided is widely employed, except in some band brake types. A pressure oil from a transmission control hydraulic circuit is used for the pressure contact (frictional engagement) between the both plates. As these frictional engagement means, a member which incorporates a oneway clutch therein and achieves easier transmission control by freely rotating a gear shaft, or the like, in one direction of rotation is partially employed.

Recently, as a oneway clutch apparatus for automatic transmission, there is increasingly employed a roller-type clutch apparatus in which rollers are interposed as torque transmitting members between an inner race and an outer race and cam surfaces are formed on the inner race. The roller-type oneway clutch apparatus is provided with springs for biasing the rollers in a direction of engagement, block bearings for forming a predetermined space between the inner race and the outer race, and a retainer to be fitted on the inner race for retaining the springs and the block bearings.

The roller type oneway clutch apparatus has characteristics including that a dragging torque is low during racing, but has a problem that a constituent part thereof easily drops off during conveyance. That is, in .the roller-type oneway clutch apparatus, since the outer race which is a constituent part of the clutch apparatus is an output shaft or an input shaft of the automatic transmission, it naturally does not exist in a sub-assembly which is a part preceding to the assembling of the automatic transmission. As a result, it any impact is applied to this sub-assembly during conveyance, rollers, springs, or block bearings which are assembled in the inner race or in a retainer may fall off comparatively easily. In this case, since the product becoming defective is required to be processed separately, the working efficiency is deteriorated. Therefore, there is proposed, as disclosed, for example, in Japanese Patent Application Laid-Open No. 2002-349607 (on page 4, FIGS. 5 and 9), a roller type oneway clutch apparatus comprising various means for causing a retainer to latch and retain rollers, springs and block bearings.

The roller type oneway clutch apparatus disclosed in Patent Application Laid-Open No. 2002-349607 is excellent in terms of preventing its constituent part from falling off, but has a problem that an assembling work of a block bearing is slightly difficult. FIG. 9 is an enlarged view of the essential part of the roller type oneway clutch apparatus of the prior art, for showing a state that a block bearing is attached to a retainer. As shown in FIG. 9, there is formed on an inner race 5 a latching groove 15 in which a convex portion 51 formed on the lower surface of the block bearing 19 is fitted, and a block bearing pressing piece 81 is integrally formed on a columnar part 37 of the retainer 21 for pressing the block bearing 19 diagonally downward. In order to attach the block bearing 19 to the inner race 5 and the retainer 21, first the block bearing 19 is advanced toward the root of the columnar part 37 diagonally, as shown in FIG. 10, and then is depressed perpendicularly toward the outer peripheral surface of the inner race 5, thereby fitting the convex part 51 in the latching groove 15, while elastically deforming the block bearing pressing piece 81, as shown in FIG. 11.

As described above, in the roller type oneway clutch apparatus disclosed in Japanese Patent Application Laid-Open No. 2002-349607, it is required to drive the block bearing 19 in two directions, that is, diagonally and perpendicularly, when it is attached to the inner race 5 and the retainer 21. For this reason, the process for driving the block bearing 19 with an automatic assembling machine becomes complicated and a high driving accuracy is required thereat, which resultantly causes line stop with high frequency due to defective assembling. Further, the time required for assembling each block bearing 19 becomes comparatively long, so that the productive efficiency is also deteriorated.

SUMMARY OF THE INVENTION

In view of the above-described circumstances, an object of the present invention is to provide a oneway clutch apparatus capable of facilitating attachment or the like of a block bearing to a retainer.

In order to solve the above problems, according to the present invention, there is proposed a oneway clutch apparatus comprising: an inner race; an outer race disposed to be coaxial with and to be rotatable relative to the inner race; a plurality of cam surfaces formed on either one of the outer peripheral surface of the inner race and the inner peripheral surface of the outer race; a cylindrical surface formed on the other of the outer peripheral surface of the inner race and the inner peripheral surface of the outer race; a plurality of torque transmitting members interposed between the cam surfaces and the cylindrical surface; biasing means for biasing the torque transmitting members; block bearings to be engaged with the concave grooves formed on the cam surfaces so as to maintain a space between the inner race and the outer race; and a retainer attached to the outer race so as to retain the torque transmitting members, the biasing means and the block bearing, the torque transmitting members being driven to be rotated to cope with the biasing force of the biasing means on the cam surfaces only during a one-directional relative rotation between the inner race and the outer race so as to perform torque transmission between the inner race and the outer race, which oneway clutch apparatus characterized in that: the block bearing is formed in a tapered-shape with the circumferential width expanding toward the cylindrical surface side; the retainer comprises, in a retaining portion of the block bearing, bearing retaining pieces respectively enlarged from the cam surfaces along the both end surfaces in the circumferential direction of the block bearing; and the bearing retaining piece has a latching portion for latching and retaining the block bearing at the tip end thereof.

In the oneway clutch apparatus of the present invention, the block bearing may have step portions in which the latching portions of the bearing retaining piece are fitted.

In the oneway clutch apparatus of the present invention, the block bearing may have concave portions in which the latching portions of the bearing retaining piece are fitted.

In the oneway clutch apparatus of the present invention, the bearing retaining piece may face an end surface in the circumferential direction of the block bearing with a predetermined space therewith excluding the latching portion in a state that the block bearing is assembled.

In the oneway clutch apparatus of the present invention, the block bearing may have chamfered portions between the end surfaces in the circumferential direction and the end surfaces on the cam surface side.

In the oneway clutch apparatus of the present invention, the retainer may be formed of synthetic resin.

According to the oneway clutch apparatus of the present invention, when the block bearing is thrust into the block bearing retaining portion of the retainer from the inner cylindrical surface side toward the cam surface side, the both bearing retaining pieces are elastically unfolded along the tapered portion of the block bearing. At the time when the block bearing is completely accommodated, the block bearing is latched and retained by the latching portions of the both bearing retaining pieces.

DETAILED DESCRIPTION OF THE PREFERRED EMBODIMENTS

Figure 1:
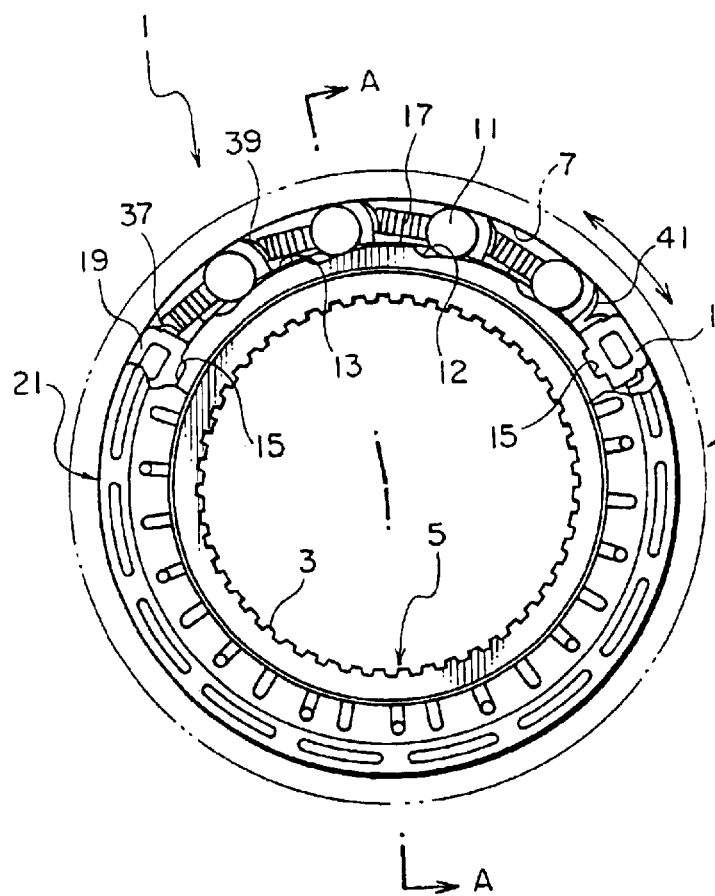
FIG. 1 is a front view of a oneway clutch apparatus according to a first embodiment of the present invention.

The present invention will be described below in detail with reference to the drawings. FIG. 1 is a front view for showing one embodiment of a oneway clutch apparatus according to the present invention, and FIG. 2 is a cross-sectional view taken along the line A—A in FIG. 1.

Figure 2:
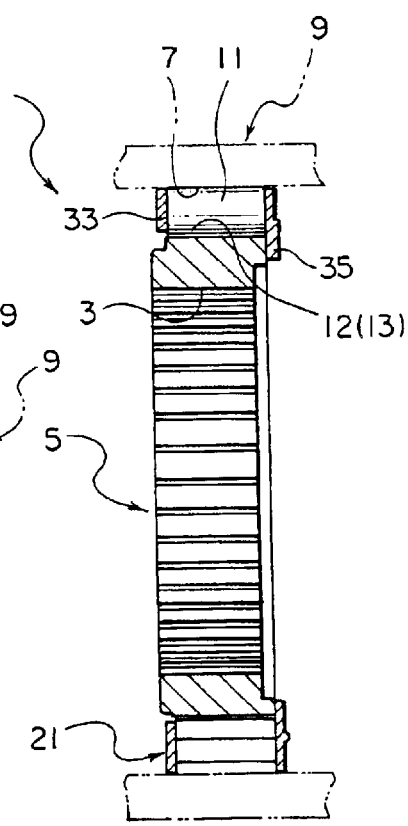
FIG. 2 is a cross-sectional view taken along the line A—A in FIG. 1.

As shown in FIGS. 1 and 2, the oneway clutch apparatus 1 of the present embodiment is constituted by an annular inner race 5 having a spline 3 on the inner peripheral surface thereof, an outer race 9 which is disposed coaxially with and to be rotatable relatively with the inner race 5 and has a cylindrical surface 7 on the inner periphery thereof, and a large number of cylindrical rollers 11 serving as torque transmitting members interposed between the inner race 5 and the outer race 9. On the outer peripheral surface of the inner race 5, there are provided a plurality of cam surfaces 13 each has a concave cam 12 formed along the circumferential direction and a latching groove 15 formed along the axial direction. The rollers 11 are disposed, respectively, between the cylindrical inner peripheral surface 7 of the outer race 9 and the concave cams 12 of the inner race 5, and are biased, respectively, by accordion springs 17 toward the direction of engagement inside the concave came 12.

Block bearings 19 formed of an oil-impregnated sintered alloy are respectively engaged with the latching grooves 15, and a space between the inner race 5 and the outer race 9 is maintained by these block bearings 19. Referring to FIGS. 1 and 2, a retainer 21 which is formed of synthetic resin such as nylon or polypropylene by an injection molding is adapted to retain the rollers 11, the accordion springs 17 and the block bearings 19 between the inner race 5 and the outer race 9. The retainer 21 comprises a unitary integral structure consisting of first and second flange portions 33 and 35, and first to third columnar portions 37, 39 and 41 coupling the both flange portions 33 and 35 together.

Figure 3:
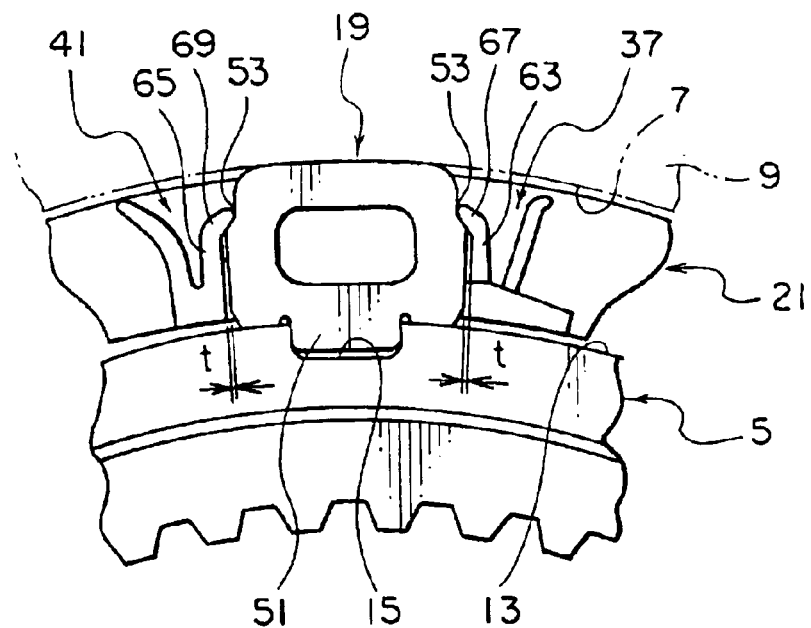
FIG. 3 is an enlarged view of the essential part of the oneway clutch apparatus according to the first embodiment.
Figure 4:
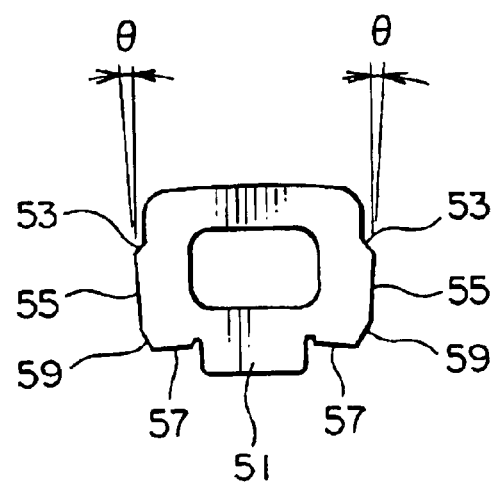
FIG. 4 is a side view of a block bearing according to the first embodiment.

FIG. 3 is an enlarged view of the essential part of the oneway clutch apparatus 1, for showing a position at which the block bearing 19 is retained. FIG. 4 is a side view of the block bearing 19, and FIG. 5 is an enlarged view of the essential part of the oneway clutch apparatus 1 in a state that the block bearing 19 is removed therefrom.

As shown in FIG. 4, the block bearing 19 presents substantially a rectangular cross section which is hollow. A convex portion 51 which is to be fitted in the latching groove 15 of the inner race 5 is formed on an end surface 57 of the block bearing 19 on the cam surface 13 side, while step portions 53 are formed on the both upper shoulder portions. The block bearing 19 is formed in a tapered shape with the circumferential width expanding toward the cylindrical inner peripheral surface 7 as indicating an inclination θ of an end surface 55 in the circumferential direction in FIG. 4, and has chamfered portions 59 between the end surfaces 55 in the circumferential direction and the end surfaces 57 on the cam surface 13 side. The block bearings 19 each is line-symmetric as a whole.

Figure 5:
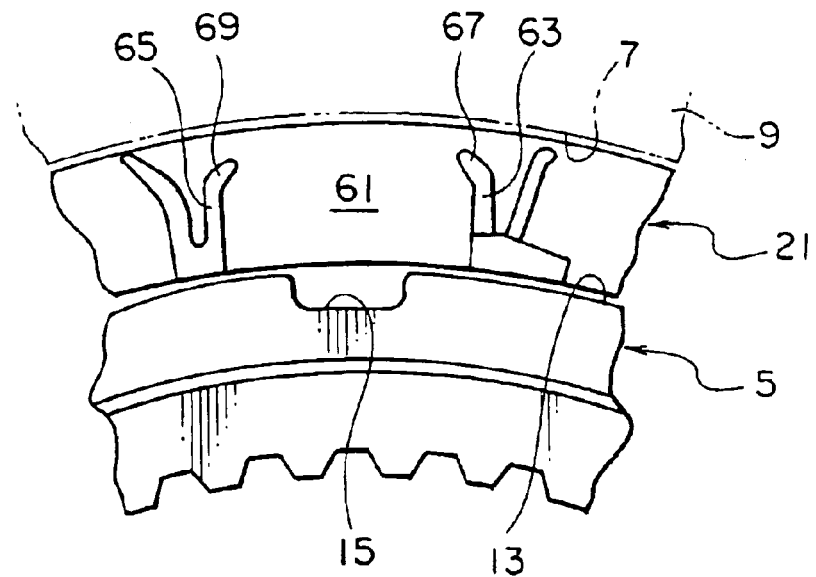
FIG. 5 is an enlarged view of the essential part of the oneway clutch apparatus according to the first embodiment in a state that the block bearing is removed therefrom.

As shown in FIG. 5, the retainer 21 comprises a retaining portion 61 in which the block bearing 19 is fitted immediately above the latching groove 15 of the inner race 5 in the drawing. Bearing retaining pieces 63 and 65 are formed substantially line symmetric on the first columnar portion 37 and the second columnar portion 41, respectively, to be extended from the cam surface 13 side to face the retaining portion 61. At the tip ends of the bearing retaining pieces 63 and 65, there are formed latching portions 67 and 69 for latching and retaining the block bearings 19. As shown in FIG. 3, in a state that the block bearings 19 is assembled, a predetermined space t is provided between the block bearing 19 and the retaining pieces 63 and 65, except the latching portions 67, 69.

In the following a mode of operation according to the first embodiment will be described.

Figure 6:
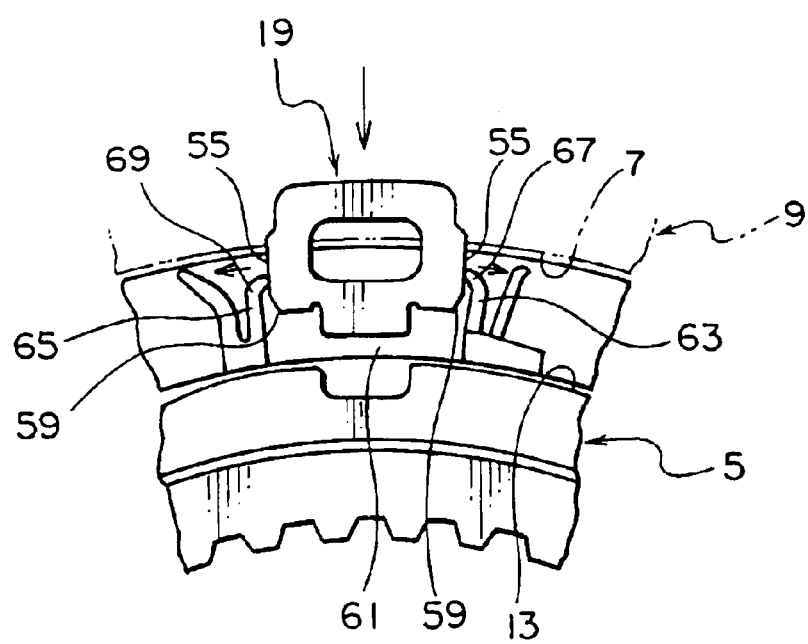
FIG. 6 is an explanatory view for illustrating an assembling process of the block bearing according to the first embodiment.

In the present embodiment, in order to assemble the oneway clutch apparatus 1, an unrepresented automatic assembling machine drives the block bearing 19 from the side of the cylindrical inner peripheral surface 7 of the outer race 9 toward the side of the outer peripheral cam surface 13 of the inner race 5. Then, the block bearing 19 advances, as shown in FIG. 6, toward the inner race 5 while spreading the both bearing retaining pieces 63 and 65. Since the block bearing 19 is formed with the chamfered portions 59 between the end surfaces 55 in the circumferential direction and the end surfaces 57 on the cam surface 13 side and has a tapered form with the circumferential width expanding toward the inner cylindrical surface 7 so that the advancement of the block bearing 19 is performed smoothly.

Figure 7:
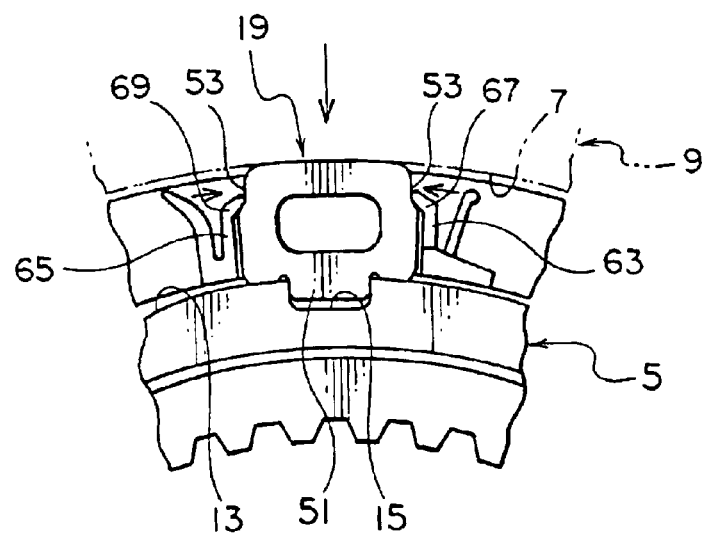
FIG. 7 is an explanatory view for illustrating the assembling process of the block bearing according to the first embodiment.

When the block bearing 19 is further driven to the cam surface 13 side, the convex portion 51 is fitted in the latching groove 15 of the inner race 5, as shown in FIG. 7, and at the same time the block bearing 19 is sandwiched by and between the bearing retaining pieces 63 and 65 owing to the elasticity thereof. In this case, the latching portions 67 and 69 of the bearing retaining pieces 63 and 65 are, respectively, fitted in the step portions 53 of the block bearing 19 and the predetermined spaces t are formed between the block bearing 19 and the bearing retaining pieces 63 and 65, whereby the block bearing 19 can be securely retained.

In the present embodiment, with such an arrangement, a driving process of the block bearing 19 by the automatic assembling machine becomes very simple, and the driving accuracy can be comparatively low. As a result, the frequency of the line stops caused by a defective assembling becomes low, while the time required for assembling each block bearing 19 is reduced, whereby the productive efficiency, etc., can be enhanced.

Figure 8:
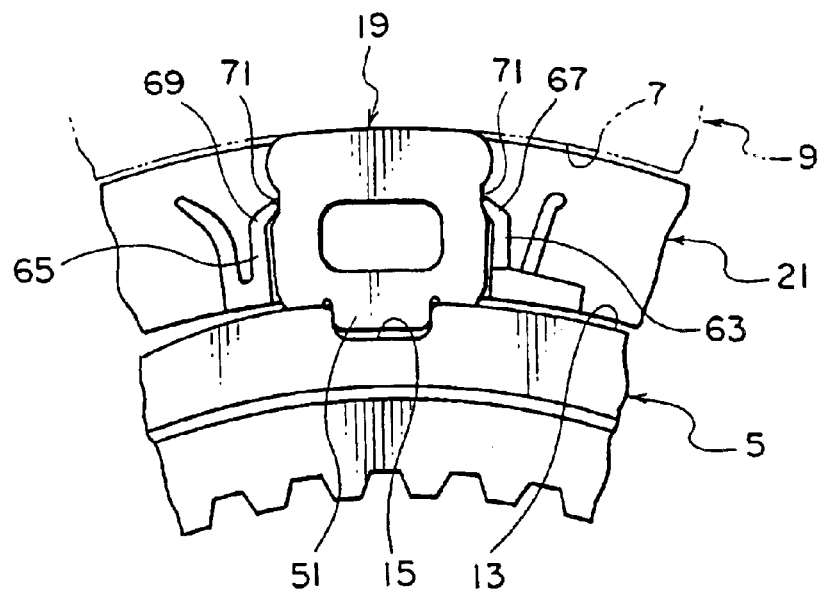
FIG. 8 is an enlarged view of the essential part of the oneway clutch apparatus according to the first embodiment.
Figure 9:
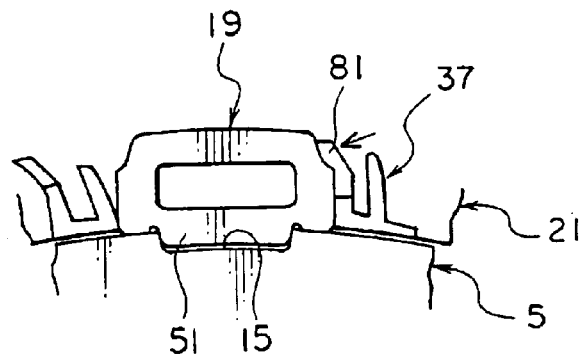
FIG. 9 is an enlarged view of the essential part of a roller type oneway clutch apparatus according to the prior art.
Figure 10:
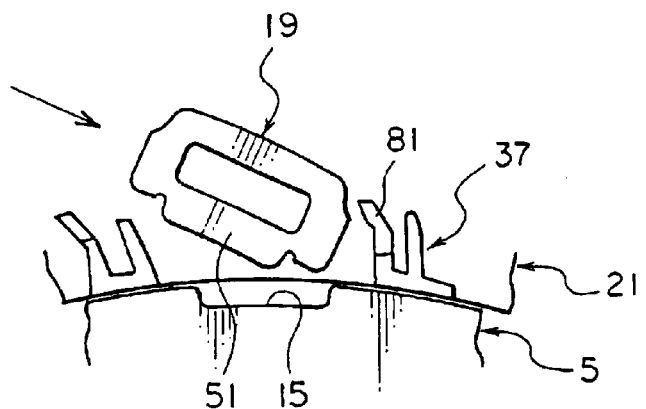
FIG. 10 is an explanatory view for illustrating an assembling process of the block bearing according to the prior art.
Figure 11:
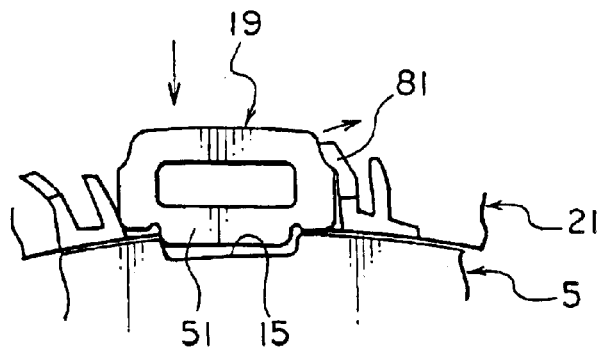
FIG. 11 is an explanatory view for illustrating the assembling process of the block bearing according to the prior art.

FIG. 8 is an enlarged view of a oneway clutch apparatus according to the second embodiment of the present invention, for showing a position at which the block bearing is retained. The structure of the second embodiment is substantially the same as that of the first embodiment described above, excepting the latching manner of the block bearing. Specifically, in the second embodiment, the block bearing 19 which is formed substantially line symmetric and is provided with concave portions 71 on the both upper shoulder portions thereof. The latching portions 67 and 69 of the bearing retaining pieces 63 and 65 are fitted in the concave portions 71. In case of the second embodiment, the operation and the effect according to the present invention are substantially the same as those of the first embodiment. However, the second embodiment is characterized by an increased area of the block bearing 19 on the cylindrical peripheral surface 7 side.

The specific description of the embodiments is as stated above. However, the present invention is not limited to those embodiments. For example, in the foregoing embodiments, the present invention is applied to a roller type oneway clutch apparatus which comprises a cam surface on the inner race side. However, the present invention may be applied to a clutch apparatus having a cam surface on the outer race side, or to a clutch apparatus provided with balls serving as the torque transmitting members, instead of the rollers. The sizes, the forms, the layout, the number, etc., of the bearing retaining pieces for pressing and retaining the block bearing and the latching portions thereof can be properly determined in accordance with the productivity, or the like, so long that they can restrict the movement of the block bearing. The whole structure of the oneway clutch apparatus, the specific forms of the respective members thereof, and the like, can be also properly altered within a range of the scope and the spirit of the present invention.

According to the oneway clutch apparatus of the present invention, when the block bearing is thrust into the block bearing retaining portion of the retainer from the inner cylindrical surface side to the cam surface side, the both bearing retaining pieces are elastically unfolded along the tapered form of the block bearing and, at the time the block bearing is completely accommodated, the block bearing is latched and retained by the latching portions of the both bearing retaining pieces, so that the attachment of the block bearing to the retainer by the automatic assembling machine, or the like, can be smoothly performed. Thus, the frequency of the line stops caused by defective assembly is decreased, while the time required for assembling one block bearing is reduced, thereby realizing improvement of the productive efficiency.

What is claimed is:

1. A oneway clutch apparatus comprising:

an inner race;

an outer race disposed to be coaxial with and to be rotatable relative to the inner race;

a plurality of cam surfaces formed on either one of the outer peripheral surface of said inner race and the inner peripheral surface of said outer race;

a cylindrical surface formed on the other of the outer peripheral surface of said inner race and the inner peripheral surface of said outer race;

a plurality of torque transmitting members interposed between said cam surfaces and said cylindrical surface;

biasing means for biasing said torque transmitting members;

block bearings to be engaged with the concave grooves formed on said cam surfaces so as to maintain a space between said inner race and said outer race; and a retainer attached to said outer race so as to retain said torque transmitting members, said biasing means and said block bearings, said torque transmitting members being driven to be rotated to cope with the biasing force of said biasing means on said cam surfaces only during a one-directional relative rotation between said inner race and said outer race so as to perform torque transmission between said inner race and said outer race, which oneway clutch apparatus characterized in that:

said block bearing is formed in a tapered-shape with the circumferential width expanding toward said cylindrical surface side;

said retainer comprises, in a retaining portion of said block bearing, bearing retaining pieces respectively enlarged from said cam surfaces along the both end surfaces in the circumferential direction of said block bearing; and said bearing retaining piece has a latching portion for latching and retaining said block bearing at the tip end thereof.

2. A oneway clutch apparatus according to claim 1, wherein said block bearing has step portions in which the latching portions of said bearing retaining pieces are respectively fitted.

3. A oneway clutch apparatus according to claim 1, wherein said block bearing has concave portions with which the latching portions of said bearing retaining pieces are engaged.

4. A oneway clutch apparatus according to claim 1, wherein said bearing retaining piece faces an end surface in the circumferential direction of said block bearing with a predetermined space therewith excluding said latching portion in a state that said block bearing is assembled.

5. A oneway clutch apparatus according to claim 1, wherein said block bearing has chamfered portions between said end surfaces in the circumferential direction and an end surface on the cam surface side.

6. A oneway clutch apparatus according to claim 1, wherein said retainer is formed of synthetic resin.

7. A oneway clutch apparatus according to claim 2, wherein said bearing retaining piece faces an end surface in the circumferential direction of said block bearing with a predetermined space therewith excluding said latching portion in a state that said block bearing is assembled.

8. A oneway clutch apparatus according to claim 3, wherein said bearing retaining piece faces an end surface in the circumferential direction of said block bearing with a predetermined space therewith excluding said latching portion in a state that said block bearing is assembled.

9. A oneway clutch apparatus according to claim 2, wherein said block bearing has chamfered portions between said end surfaces in the circumferential direction and an end surface on the cam surface side.

10. A oneway clutch apparatus according to claim 3, wherein said block bearing has chamfered portions between said end surfaces in the circumferential direction and an end surface on the cam surface side.

11. A oneway clutch apparatus according to claim 2, wherein said retainer is formed of synthetic resin.

12. A oneway clutch apparatus according to claim 3, wherein said retainer is formed of synthetic resin.

* * * * *